US010972587B1

(12) United States Patent
Delaney et al.

(10) Patent No.: US 10,972,587 B1
(45) Date of Patent: Apr. 6, 2021

(54) SYSTEMS AND METHODS FOR ALTERING THE CHARACTER OF NETWORK TRAFFIC

(71) Applicant: Berryville Holdings, LLC, Herndon, VA (US)

(72) Inventors: Christopher Edward Delaney, Front Royal, VA (US); Chava Louis Jurado, Leesburg, VA (US); Jeremiah MacDonald, Greenville, SC (US); Carl Bailey Jacobs, Fredericksburg, VA (US)

(73) Assignee: Berryville Holdings, LLC, Herndon, VA (US)

(*) Notice: Subject to any disclaimer, the term of this patent is extended or adjusted under 35 U.S.C. 154(b) by 0 days.

(21) Appl. No.: 16/560,105

(22) Filed: Sep. 4, 2019

Related U.S. Application Data

(60) Provisional application No. 62/732,691, filed on Sep. 18, 2018.

(51) Int. Cl.
*H04L 12/28* (2006.01)
*H04L 29/08* (2006.01)
*H04L 12/805* (2013.01)
*H04L 12/46* (2006.01)

(52) U.S. Cl.
CPC ........ *H04L 69/326* (2013.01); *H04L 12/4641* (2013.01); *H04L 47/36* (2013.01)

(58) Field of Classification Search
CPC ... H04L 69/326; H04L 12/4641; H04L 47/36; H04L 12/46; H04L 47/10
See application file for complete search history.

(56) References Cited

U.S. PATENT DOCUMENTS

| 9,444,723 | B1* | 9/2016 | Di Benedetto | H04L 12/4641 |
| 2005/0005024 | A1* | 1/2005 | Samuels | H04L 67/28 709/238 |
| 2013/0051406 | A1* | 2/2013 | Bugge | H04L 12/6418 370/475 |
| 2015/0288603 | A1* | 10/2015 | Kandasamy | H04W 28/0257 370/392 |
| 2017/0353935 | A1* | 12/2017 | Xiang | H04L 47/10 |
| 2019/0020593 | A1* | 1/2019 | Kumar | H04L 63/20 |
| 2019/0312820 | A1* | 10/2019 | Yu | H04L 47/36 |

* cited by examiner

*Primary Examiner* — Abdelnabi O Musa
(74) *Attorney, Agent, or Firm* — Jones Day

(57) ABSTRACT

Systems and methods for altering the character of data originating from a Virtual Private Network (VPN) are provided. First data is received from the VPN by a first network interface. The first data comprises a first plurality of packets. A message is generated by combining the first plurality of packets. Second data is generated by segmenting the message into a second plurality of packets. A third plurality of packets in the second plurality of packets is equal to the network maximum transfer unit allowed by the Internet and the last packet in the second plurality of packets is less than the network maximum transfer unit allowed by the Internet. The second data is forwarded to the second network interface. The second network interface sends the data to a web server.

20 Claims, 5 Drawing Sheets

SYSTEMS AND METHODS FOR ALTERING THE CHARACTER OF NETWORK TRAFFIC

CROSS-REFERENCE TO RELATED APPLICATIONS

This application claims priority to U.S. Provisional Application No. 62/732,691, filed Sep. 18, 2018, entitled "Systems and Methods for Altering the Character of Network Traffic," which is incorporated herein by reference in its entirety.

TECHNICAL FIELD

The technology described herein relates to secure communications and more particularly to secure communications that use Virtual Private Networks (VPNs) and/or Reconnaissance Resistant Networks (RRNs).

BACKGROUND

VPNs tend to provide users with various advantages over using a raw Internet connection. As one example, a user can avoid interception and surveillance through use of a VPN. The VPN, rather than the user's local computer, has an Internet point-of-presence visible to third parties. As another example, the use of a VPN allows the user to appear to be accessing the Internet from the geographic location that corresponds to the VPN's Internet point-of-presence. This means that the user may be able to access resources that are geographically-restricted by the user's local computer, but allowed by the VPN. In addition, through the use of a VPN, the user could disguise his/her true geographic location from outside observers for other reason.

The use of a VPN may also create disadvantages. For example, because the VPN encapsulates the user's network packet data inside an additional layer of network protocols, the character of the user's data is necessarily altered. Because the VPN layer adds overhead to the network packet data, the VPN divides the network packet data into smaller chunks so that they, along with the overhead, can fit inside an underlying network transport layer's maximum transfer unit (MTU) size. An internet resource server that the VPN connects to on behalf of the user can determine that the user is traversing the VPN before appearing on the open internet by analyzing the VPN data characteristics, specifically the size of the data. If a service provider detects that the user is traversing a VPN, it could take preventative actions that are adverse to the user. For example, the service provider could prevent the user from accessing geographically-restricted information, throttle the user's data rate, or otherwise interfere with the user's normal network operations, thereby cancelling out some of the benefits provided through the use of the VPN.

SUMMARY

A method for altering the character of data originating from a Virtual Private Network (VPN) is provided. First data is received from the VPN. The first data is received from the first network interface, the first data comprising a first plurality of packets. A message is generated by combining the first plurality of packets. Second data is generated by segmenting the message into a second plurality of packets. A third plurality of packets in the second plurality of packets is equal to the network maximum transfer unit allowed by the Internet and the last packet in the second plurality of packets is less than the network maximum transfer unit allowed by the Internet. The second data is forwarded to a second network interface and is sent to a webserver.

As another example, a system for altering the character of data originating from a Virtual Private Network (VPN) is provided. The system comprises: a first network interface device configured to receive first data from the VPN; a second network interface device configured to send second data to a web server; and a data processor. First data is received from the VPN. The first data is received from the first network interface, the first data comprising a first plurality of packets. A message is generated by combining the first plurality of packets. Second data is generated by segmenting the message into a second plurality of packets. A third plurality of packets in the second plurality of packets is equal to the network maximum transfer unit allowed by the Internet and the last packet in the second plurality of packets is less than the network maximum transfer unit allowed by the Internet. The second data is forwarded to the second network interface and is sent to a web server.

As a further example, a non-transitory computer readable storage medium storing one or more programs configured to be executed by one or more data processors, the one or more programs comprising instructions for altering the character of data originating from a Virtual Private Network (VPN), is provided. The first data is received from the first network interface, the first data comprising a first plurality of packets. A message is generated by combining the first plurality of packets. Second data is generated by segmenting the message into a second plurality of packets. A third plurality of packets in the second plurality of packets is equal to the network maximum transfer unit allowed by the Internet and the last packet in the second plurality of packets is less than the network maximum transfer unit allowed by the Internet. The second data is forwarded to a second network interface and is sent to a web server.

DETAILED DESCRIPTION

It may be desirable, in certain use cases, for a user to access the Internet by way of an Recon-Resistant Network (RRN) or VPN, while ensuring that his/her network traffic cannot be analyzed in such a way as to reveal the use of the VPN/RRN. The presently described systems and methods can be employed by a user connected to a VPN to alter the character of the network traffic such that the fact that the user is accessing the internet via a VPN will not be revealed to third parties. In this way, the user could use a VPN/RRN to access network resources that would otherwise be geographically-restricted to the VPN/RRN. Additionally, the opportunity for third parties to interfere with the user's connection could be reduced due to the altered character of the network traffic.

Figure 1:
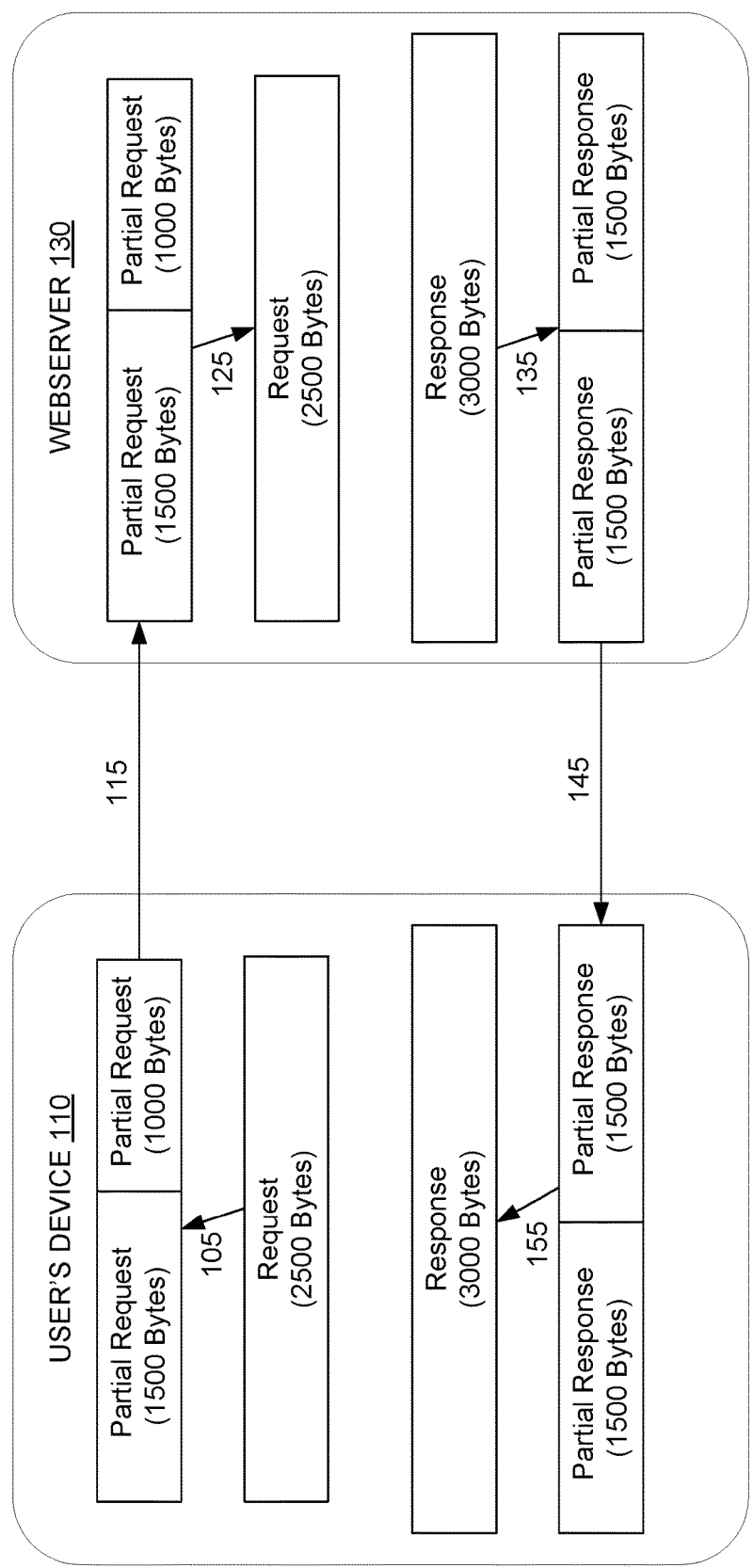
FIG. 1 depicts a basic internet connection between a user's device and a webserver hosting a web site on the Internet.

FIG. 1 depicts a basic internet connection between a user's device 110 and a webserver 130 hosting a website on the Internet. The user, through the user's device 110, wishes to access the website. Accordingly, a request that is 2500 bytes originates at the user's device 110. Because the request is larger than a network MTU (e.g., 1500 bytes), the request is divided into chunks, i.e., packets, at 105 less than or equal to the MTU size before leaving the user's device 110 and traversing the Internet at 115 and 125. The webserver 130 receives the packets at 115 and 125 and reassembles the packets into the original, complete request at 135. A response that is 3000 bytes that originates from the webserver 130 is similarly handled. Before leaving the webserver 130, the response, which is larger than the network MTU, is divided into packets at 145 less than or equal to the MTU size before traversing the Internet at 155 and 165. The user's device 110 receives the packets at 155 and 165 and reassembles the packets into the original, complete response at 175.

Figure 2:
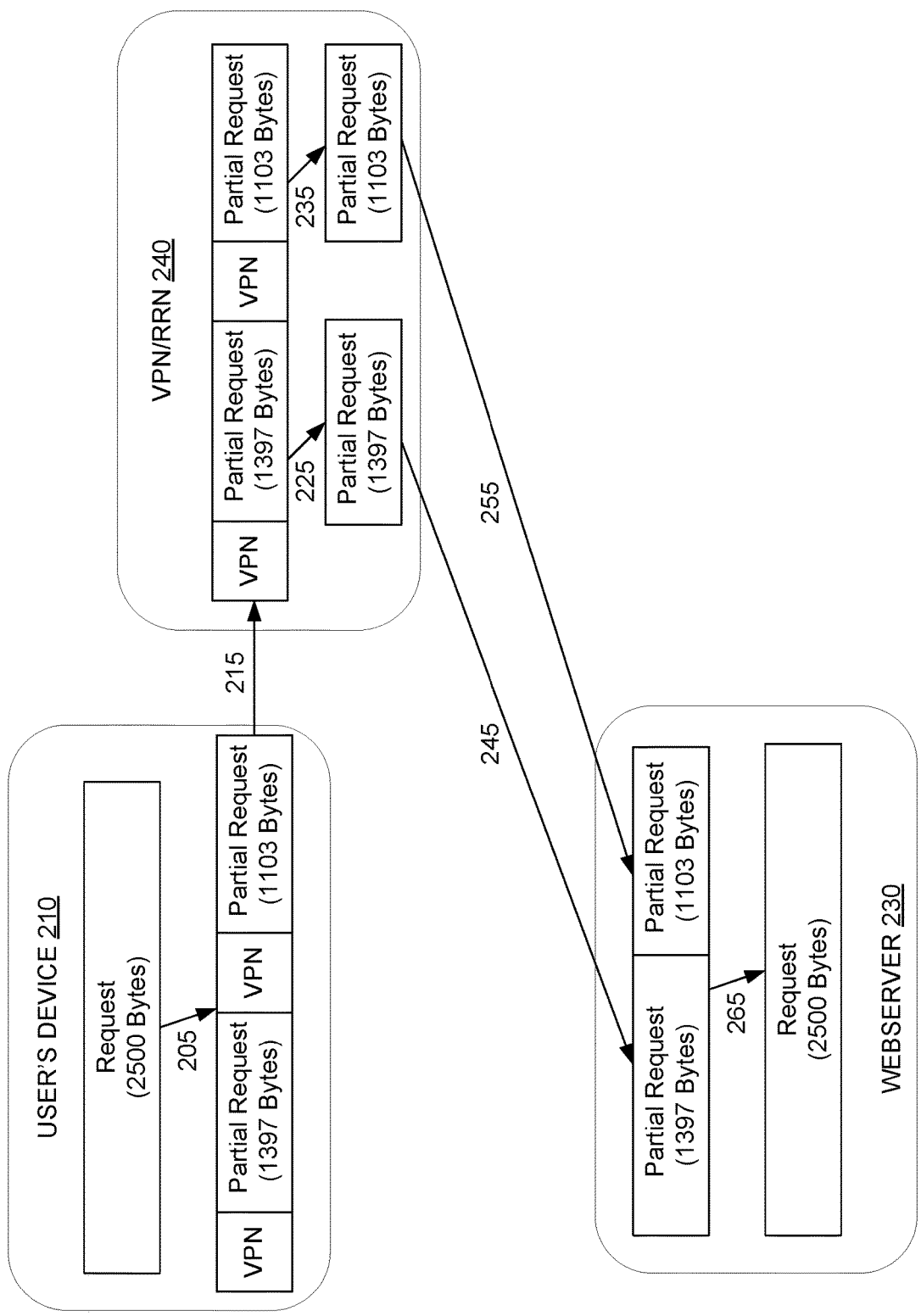
FIG. 2 depicts an internet connection when a VPN/RRN is used between a user's device and a webserver hosting a website on the Internet.

FIG. 2 depicts an internet connection when a VPN/RRN 240 is used between a user's device 210 and a webserver 230 hosting a website on the Internet. The architecture is similar to that of FIG. 1, except that VPN/RRN 240 is inserted between the user's device 210 and the webserver 230. The request, and not the response, is shown for clarity. The response would be handled similarly to the request, albeit in the opposite direction.

The user, through the user's device 210, wishes to access the website. Accordingly, a request that is 2500 bytes originates at the user's device 210. Because the request is larger than a network MTU (e.g., 1500 bytes), the request is divided into chunks, i.e., packets, at 205 less than or equal to the MTU size before leaving the user's device 210. In this case, the packets include VPN overhead data, e.g., header data, so more packets with smaller payloads are required. Here, as an example, the two packets are 1397 bytes and 1103 bytes. The VPN/RRN 240 receives the VPN packets at 215. At 225 and 235, the VPN/RRN 240 strips off the VPN header data. The resulting packets traverse the Internet at 245 and 255. The resulting packets are smaller than non-VPN packets would be. The webserver 230 receives the packets at 245 and 255 and reassembles the packets into the original, complete request at 265 as it did in FIG. 1. Because the packets received by the webserver 230 are smaller than non-VPN packets would be, an observer at the webserver 230 can surmise that the traffic must have originated from somewhere behind a VPN/RRN.

Figure 3:
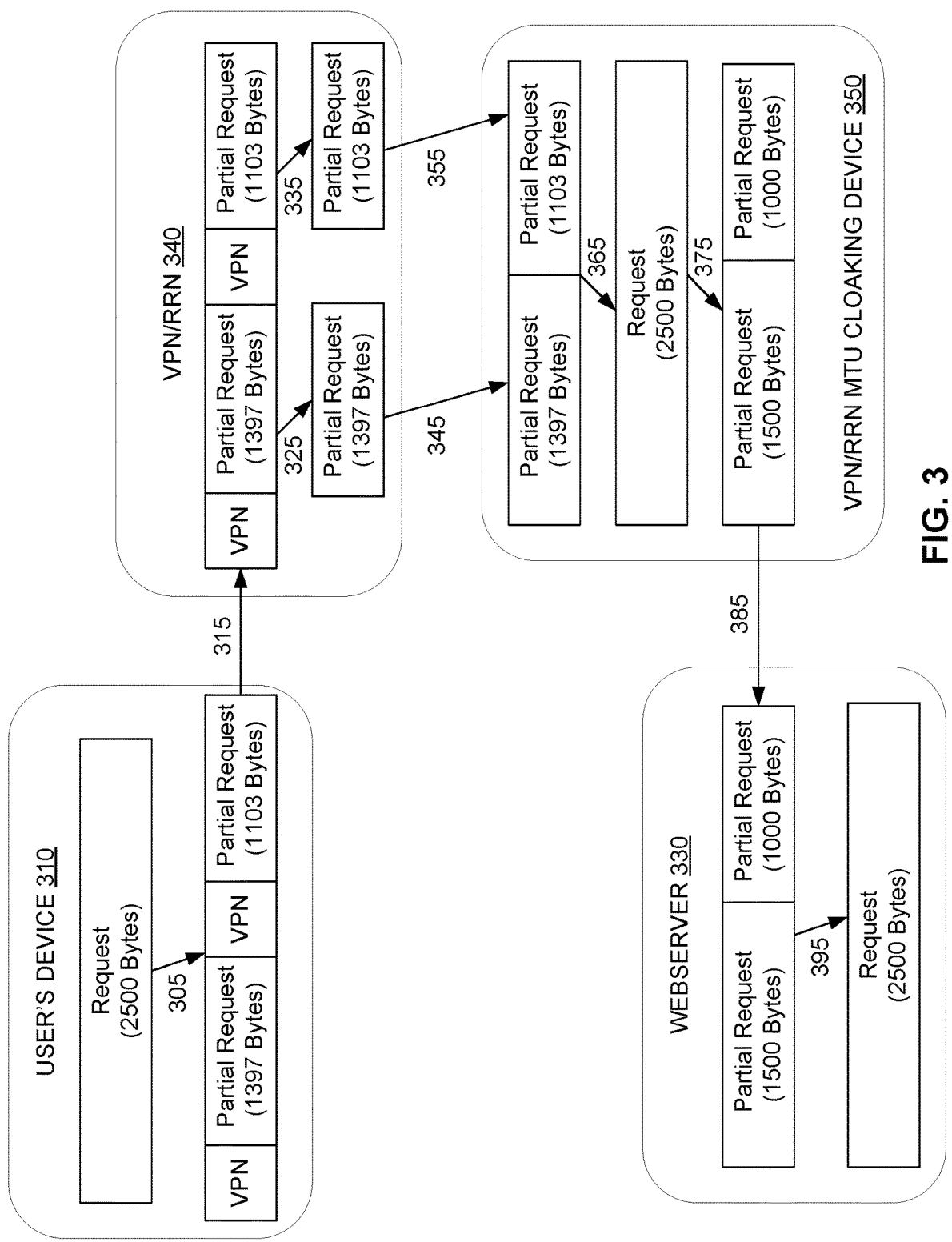
FIG. 3 depicts how a device for altering the character of network traffic can be used by a user using a VPN/RRN to access an Internet website as in FIG. 2.

FIG. 3 depicts how a device for altering the character of network traffic can be used by a user using a VPN/RRN to access an Internet website as in FIG. 2. The architecture is similar to that of FIG. 2, except that a VPN/RRN MTU cloaking device 350 is inserted between a VPN/RRN 340 and a webserver 330. The VPN/RRN MTU cloaking device 350 receives and reassembles the response chunks as the webserver 230 did in FIG. 2. Therefore, the VPN/RRN MTU cloaking device 350 can surmise that the traffic originated from somewhere behind a VPN/RRN. Because the user or the user's organization controls the VPN/RRN MTU cloaking device 350, third parties do not have access to this information.

A request that is 2500 bytes originates at a user's device 310. Because the request is larger than a network MTU (e.g., 1500 bytes), the request is divided into chunks at 305 less than or equal to the MTU size before leaving the user's device 310. As in FIG. 2, the packets include VPN overhead data, e.g., header data, so more packets with smaller payloads are required. Here, as an example, the two payloads are 1397 bytes and 1103 bytes. The VPN/RRN 340 receives the VPN packets at 315. Before reaching the VPN/RRN MTU cloaking device 350, the VPN/RRN 340 strips the VPN header data at 325 and 335. The resulting payloads are received by the VPN/RRN MTU cloaking device 350 at 345 and 355. The VPN/RRN MTU cloaking device 350 reassembles the payloads into the original, complete request at 365. The VPN/RRN MTU cloaking device 350 breaks the request into packets of the "standard" network size at 375. The packets traverse the Internet and are received by the webserver at 380 and 385. The webserver 330 reassembles the packets into the original, complete request at 395 as it did in FIG. 1. Because the webserver 330 receives the packets in the form of "standard" network MTU-sized packets, an observer at the webserver cannot determine that the request originated on the other end of the VPN/RRN.

Figure 4:
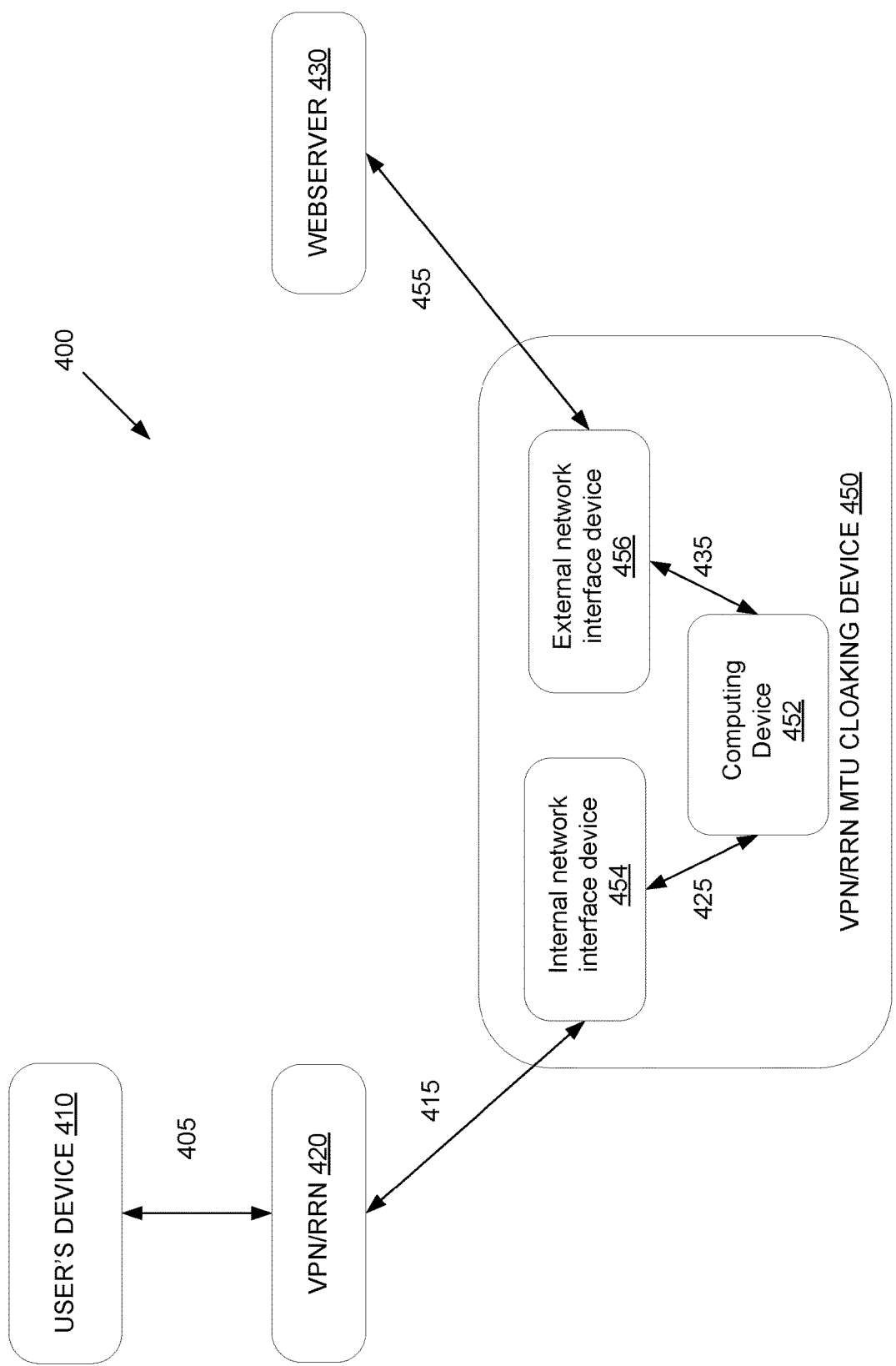
FIG. 4 depicts a diagram of a system for altering the character of network traffic.

FIG. 4 depicts a diagram of a system 400 of how a device for altering the character of network traffic could be used by a user using a VPN/RRN to access an Internet website. The communication occurs as it did in FIG. 3.

The VPN/RRN MTU cloaking device 450 comprises a physical computing device 452 and multiple network-interface devices, e.g., 454 and 456. The physical computing device can comprise, e.g., a small device such as a Raspberry Pi or any sufficiently-powerful device, including a laptop, desktop, or server-grade machine. The multiple network-interface devices can be built in to the computing device or physically distinct and may comprise an ethernet port or an integrated WiFi adapter, a USB WiFi adaptor, a USB 3G/4G adapter, or a USB-tethered cellular device such as a mobile phone or hotspot device. One of the network interfaces can be designated as the "internal" network interface 454 (i.e., the interface that the VPN/RRN MTU cloaking device 350 will use to establish a connection to a VPN/RRN). Another network interface can be designated as the "external" 456 network interface (i.e., the interface that connects to the Internet). The computing device runs software which performs the operations necessary to implement the network infrastructure break as described with respect to FIG. 3.

The software running on the computing device 452 in the VPN/RRN MTU cloaking device 450 may perform a number of steps. As an example, the computing device 452 may configure its internal network services in such a way that the network packets that arrive on one of the network interfaces will be forwarded to the other network interface. As another example, the computing device 452 may configure the external network interface to perform Network Address Translation (NAT) on traffic that arrives on the internal network interface 454 that will use the external network interface 456 to reach its destination. The VPN/RRN MTU cloaking device 450 may use its internal interface to establish a connection (e.g., using configured credentials) to the VPN/RRN 420. The VPN/RRN MTU cloaking device 450 may register with the VPN/RRN service 420, indicating that it is a Point of Presence that users may use to access the Internet, optionally including its geographic location so that the VPN/RRN service 420 may provide that information to its users.

When a user who is connected to the VPN/RRN 420 selects the VPN/RRN MTU cloaking device 450 as its VPN/RRN exit point or point-of-presence, the VPN/RRN service 420 can direct the user's traffic to the VPN/RRN MTU cloaking device 450 as if the VPN/RRN were directly connected to the Internet. The computing device 452 can perform Network Address Translation on the outgoing network packets; in so doing, the VPN/RRN MTU cloaking device 450 can accomplish at least the following two things: (1) an IP address corresponding to the external interface to the traffic can be applied to the outgoing network packets so that the traffic appears to be originating from the geographic location of the VPN/RRN MTU cloaking device 450; (2) the characteristics of the traffic can be altered so that the traffic appears to be originating from a device that is directly connected to the Internet, rather than from a user who is behind a VPN.

The systems and methods herein can make use of various types of network connections (e.g., Ethernet, Wifi, and 3G/4G cellular connections). The various network connections can be used to further disguise the type of connection a user has to the internet. For example, a user who is accessing the internet via a corporate infrastructure network, leveraging the systems and methods described herein, might appear to be accessing the internet from a 4G cellular link instead. Using different categories of network interfaces for the internal network interface device 454 and the external network interface device 456 can reduce opportunity for third parties to observe a user's activity and/or data. If the systems and methods described herein are used at an interface between two different types of network connection, a third party with access or oversight to the first network connection could not necessarily observe traffic on the second network connection on the other side of the network interface, e.g., the internal network interface device 454 or the external network interface device 456. For example, if the system described herein is used at the interface between an ISP-provided Ethernet connection and a USB-tethered cellular device, a third party observer on the ISP side could observe all network traffic terminate at the system, but could not determine the destination of the traffic beyond the system; likewise, a third party observer on the cellular provider side could observe the network traffic originating from the system, but could not determine the source of the traffic.

With reference to FIG. 4, a third party observer may or may not be able to access the traffic in the system 400 at various vantage points. At 405, an observer observing the network connection between a user's device 410 and the VPN/RRN 420 could see a VPN-style connection between the user's device 410 and the VPN/RRN 420. At 415, an observer observing the connection between the VPN/RRN 420 and the internal network interface device 454 could see an encrypted data stream, making it nearly impossible to infer information about the user on the other side of the VPN/RRN 420. At 425 and 435, an observer cannot access these connections because they are physically inside the VPN/RRN MTU cloaking device 450. At 455, an observer can see standard Internet traffic (e.g., activity such as web browsing, file transfers, media streaming, DNS lookups). Because the protocol at this vantage point looks as it normally does, there is no indication that there is anything other than a proximate user on the other side of the connection at 455, as opposed to a remote user using a VPN/RRN.

Even if a third party observer was able to observe traffic at 405 and 455, the third party observer would not necessarily be able to determine that the connections at 405 and 455 were related to each other. Each connection can traverse a different medium, such that there is no network protocol indication that suggests that the connections 405 and 455 are related to each other. Further, the traffic on the internal VPN side is cloaked by an encrypted tunnel, whereas the traffic on the external Internet side is secured to the same extent as the protocol (e.g., HTTPS) that it uses.

Figure 5:
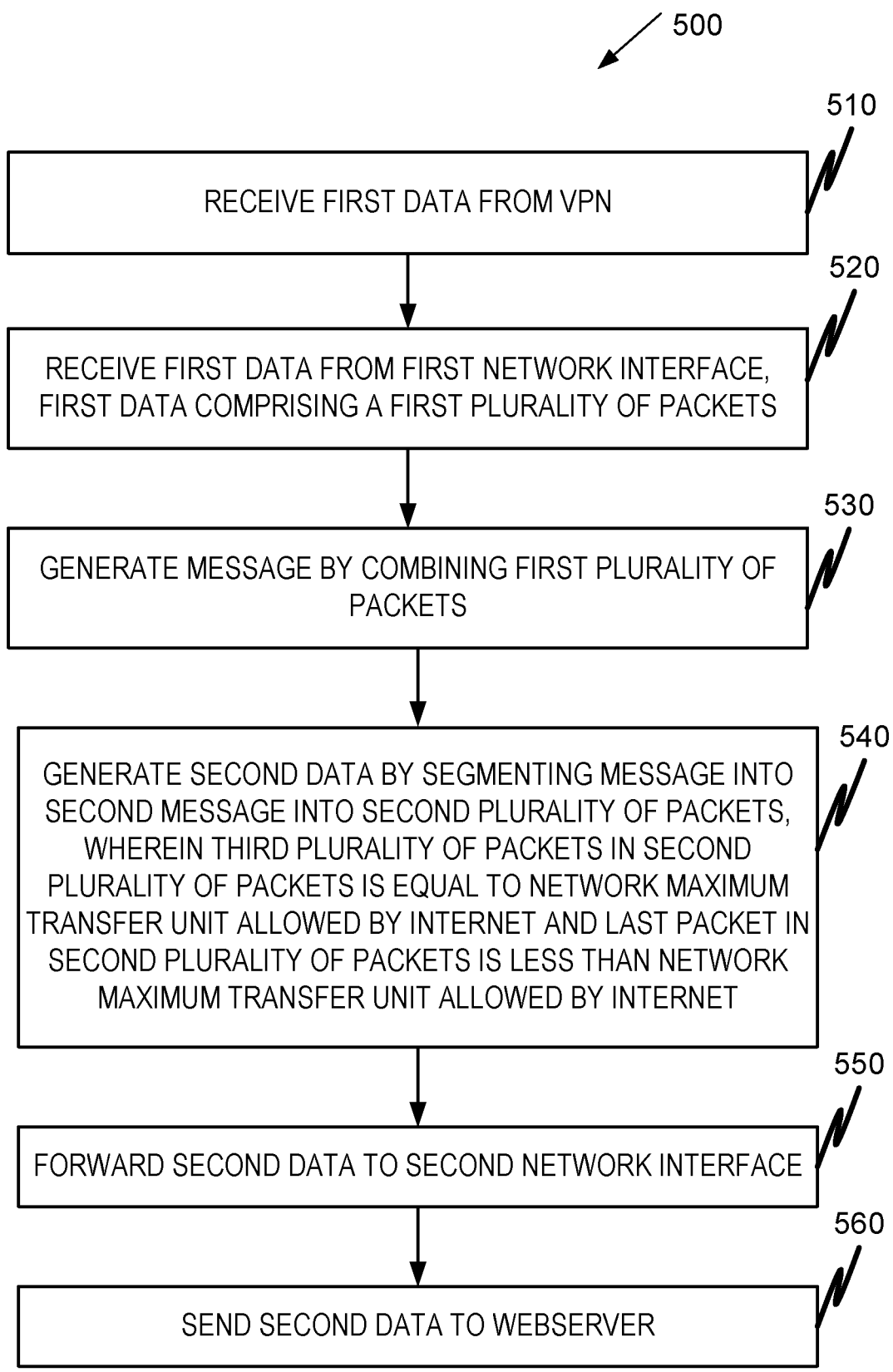
FIG. 5 is a flow diagram depicting a method for altering the character of network traffic.

FIG. 5 depicts an exemplary flow diagram for altering the character of network traffic. At 510, first data is received from a VPN. First data is received from a first network interface, the first data comprising a first plurality of packets, at 520. At 530, a message is generated by combining the first plurality of packets. Second data is generated by segmenting the message into a second plurality of packets at 540. A third plurality of packets in the second plurality of packets is equal to the network maximum transfer unit allowed by the Internet and the last packet in the second plurality of packets is less than the network maximum transfer unit allowed by the Internet. At 550, second data is forwarded to a second network interface. The second data is sent to a webserver at 560.

Examples have been used to describe the invention herein, and the scope of the invention may include other examples.

It is claimed:

1. A system for altering the character of data originating from a Virtual Private Network (VPN), the system comprising:
    a first network interface device configured to receive first data from the VPN;
    a second network interface device configured to send second data to a webserver;
    a data processor coupled to the first network interface device and the second network interface device having memory storing instructions, which when executed result in operations comprising:
        receiving the first data from the first network interface device, the first data comprising a first plurality of packets;
        generating a message by combining the first plurality of packets;
        generating the second data by segmenting the message into a second plurality of packets, wherein a third plurality of packets in the second plurality of packets is equal to the network maximum transfer unit allowed by the Internet and the last packet in the second plurality of packets is less than the network maximum transfer unit allowed by the Internet; and
        forwarding the second data to the second network interface device;
    wherein each packet in the first plurality of packets is smaller than a network maximum transfer unit allowed by the Internet due to the VPN removing VPN headers from third data originating from a user computing device in communication over the Internet with the VPN.

2. The system of claim 1, the operations further comprising:
    determining an external IP address not restricted by the webserver;
    sending the second data over the second network interface device using the external IP address as a source address.

3. The system of claim 1, wherein the first data indicates a desire by the user computing device to perform at least one of the following activities: web browsing, file transfers, media streaming, and domain name server (DNS) lookups.

4. The system of claim 1, wherein a type of the first network interface device is selected from the group comprising: an Ethernet port, an integrated WiFi adapter, a USB WiFi adaptor, a mobile communications adapter, or a USB-tethered cellular device.

5. The system of claim 1, wherein the data processor resides on one of the following: a Raspberry Pi, a laptop, a desktop, or a server-grade machine.

6. The system of claim 1, the operations further comprising:
registering an internal IP address with a VPN service in the VPN, the internal IP address corresponding to a point of presence for accessing the Internet; and
establishing a connection between the first network interface device and the VPN using the internal IP address.

7. The system of claim 1, wherein all but the last packet in the second plurality of packets is equal to the network maximum transfer unit allowed by the Internet.

8. The system of claim 1, the operations further comprising:
performing network address translation (NAT) on the second data prior to forwarding the second data to the second network interface device.

9. A method for altering the character of data originating from a Virtual Private Network (VPN), the method comprising:
receiving first data from the VPN;
receiving the first data from a first network interface device forming part of a cloaking device, the first data comprising a first plurality of packets;
generating a message by combining the first plurality of packets;
generating second data by segmenting the message into a second plurality of packets, wherein a third plurality of packets in the second plurality of packets is equal to the network maximum transfer unit allowed by the Internet and the last packet in the second plurality of packets is less than the network maximum transfer unit allowed by the Internet;
forwarding the second data to a second network interface device forming part of the cloaking device; and
sending, by the second network interface device, second data to a remote computing device;
wherein each packet in the first plurality of packets is smaller than a network maximum transfer unit allowed by the Internet due to the VPN removing VPN headers from third data originating from a user computing device in communication over the Internet with the VPN.

10. The method of claim 9, wherein the remote computing device is a webserver, and the method further comprises:
determining an external IP address not restricted by the webserver;
sending the second data over the second network interface device using the external IP address as a source address.

11. The method of claim 9, wherein the first data indicates a user's desire to perform at least one of the following activities: web browsing, file transfers, media streaming, and DNS lookups.

12. The method of claim 9, wherein a type of the first network interface device is selected from the group comprising: an Ethernet port, an integrated WiFi adapter, a USB WiFi adaptor, a mobile communications adapter, or a USB-tethered cellular device.

13. The method of claim 9, wherein the data processor resides on one of the following: a Raspberry Pi, a laptop, a desktop, or a server-grade machine.

14. The method of claim 9, the operations further comprising:
registering an internal IP address with a VPN service in the VPN, the internal IP address corresponding to a point of presence for accessing the Internet; and
establishing a connection between the first network interface device and the VPN using the internal IP address.

15. The method of claim 9, wherein all but the last packet in the second plurality of packets is equal to the network maximum transfer unit allowed by the Internet.

16. The method of claim 9 further comprising:
performing network address translation (NAT) on the second data prior to forwarding the second data to the second network interface.

17. A non-transitory computer readable storage medium for altering the character of data originating from a Virtual Private Network (VPN), the non-transitory computer readable storage medium storing instructions, which when executed by one or more data processors, result in operations comprising:
receiving first data from the VPN;
receiving the first data from a first network interface device, the first data comprising a first plurality of packets;
generating a message by combining the first plurality of packets;
generating second data by segmenting the message into a second plurality of packets, wherein a third plurality of packets in the second plurality of packets is equal to the network maximum transfer unit allowed by the Internet and the last packet in the second plurality of packets is less than the network maximum transfer unit allowed by the Internet;
forwarding the second data to a second network interface device forming part of the cloaking device; and
sending, by the second network interface, second data to a remote computing device;
wherein each packet in the first plurality of packets is smaller than a network maximum transfer unit allowed by the Internet due to the VPN removing VPN headers from third data originating from a user computing device in communication over the Internet with the VPN.

18. The non-transitory computer readable storage medium of claim 17, wherein all but the last packet in the second plurality of packets is equal to the network maximum transfer unit allowed by the Internet.

19. The non-transitory computer readable storage medium of claim 17, wherein the remote computing device is a webserver and the operations further comprise:
determining an external IP address not restricted by the webserver;
sending the second data over the second network interface device using the external IP address as a source address.

20. The non-transitory computer readable storage medium of claim 17, wherein the operations further comprise:
registering an internal IP address with a VPN service in the VPN, the internal IP address corresponding to a point of presence for accessing the Internet; and
establishing a connection between the first network interface device and the VPN using the internal IP address.

* * * * *